United States Patent
Mallikarjunan et al.

(10) Patent No.: US 11,470,514 B2
(45) Date of Patent: Oct. 11, 2022

(54) MITIGATING THE DEGRADATION OF QUALITY OF A MULTIMEDIA DATA STREAM AT A REMOTE ENDPOINT

(71) Applicant: Apple Inc., Cupertino, CA (US)

(72) Inventors: Raghuveer Mallikarjunan, Sunnyvale, CA (US); Sree Ram Kodali, San Jose, CA (US); Ajoy K. Singh, Milpitas, CA (US); Vijay Venkataraman, San Jose, CA (US); Hsien-Po Shiang, Mountain View, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 16/889,346

(22) Filed: Jun. 1, 2020

(65) Prior Publication Data

US 2020/0383008 A1 Dec. 3, 2020

Related U.S. Application Data

(60) Provisional application No. 62/854,772, filed on May 30, 2019.

(51) Int. Cl.
*H04W 36/00* (2009.01)
*H04W 36/14* (2009.01)
*H04W 84/04* (2009.01)
*H04W 80/06* (2009.01)
*H04W 84/12* (2009.01)

(52) U.S. Cl.
CPC ........ *H04W 36/0011* (2013.01); *H04W 36/14* (2013.01); *H04W 80/06* (2013.01); *H04W 84/042* (2013.01); *H04W 84/12* (2013.01)

(58) Field of Classification Search
CPC ............. H04W 36/0011; H04W 36/14; H04W 84/042; H04W 80/06; H04W 84/12; H04W 36/026; H04W 36/30
See application file for complete search history.

(56) References Cited

U.S. PATENT DOCUMENTS

| | | | | |
|---|---|---|---|---|
| 2005/0096045 A1* | 5/2005 | Palmer | ................. | H04W 36/24 455/423 |
| 2007/0005804 A1* | 1/2007 | Rideout | ............... | H04N 19/132 375/E7.181 |
| 2012/0163344 A1* | 6/2012 | Bakthavathsalu | .... | H04W 36/30 370/332 |

* cited by examiner

*Primary Examiner* — Marcos L Torres
(74) *Attorney, Agent, or Firm* — Fay Kaplun & Marcin, LLP

(57) ABSTRACT

A user equipment (UE) configured to establish a multimedia data stream with a further UE, identify a predetermined condition, wherein the predetermined condition indicates a decrease in quality of the multimedia data stream at the further UE and implement a mechanism to mitigate the degradation of the decrease in quality of the multimedia data stream at the further UE.

18 Claims, 5 Drawing Sheets

MITIGATING THE DEGRADATION OF QUALITY OF A MULTIMEDIA DATA STREAM AT A REMOTE ENDPOINT

PRIORITY CLAIM/INCORPORATION BY REFERENCE

This application claims priority to U.S. Provisional Application 62/854,772 filed on May 30, 2019 entitled "Mitigating the Degradation of Quality of a Multimedia Data Stream at a Remote Endpoint," the entirety of which is incorporated by reference herein.

BACKGROUND

A user equipment (UE) may establish a connection to at least one of a plurality of different networks or types of networks. To establish the connection and perform the full scope of functionalities normally available to the UE via the network connection, the UE may camp on a base station of a corresponding network. When connected, the UE may be configured to stream multimedia data to a remote endpoint. For example, the UE may participate in a video call with a further UE.

The perceived quality of the audio and/or video output at the further UE may be affected by an event related to the UE's network connection and the UE's subsequent response to the event. For example, during the video call the UE may encounter an event that causes the UE to momentarily stop the transmission of the multimedia data or modify a parameter of the multimedia data stream. As a result of this type of behavior from the UE, the audio and/or video output at the further UE may appear to glitch and lag during the video call. Accordingly, how the UE is configured to respond to an event related to the UE's network connection may have a direct effect on the quality of the audio and/or video at the further UE.

SUMMARY

Some exemplary embodiments are related to a method performed by a user equipment (UE) configured with a wireless network connection. The method includes establishing a multimedia data stream with a further UE, identifying a predetermined condition, wherein the predetermined condition indicates a decrease in quality of the multimedia data stream at the further UE and implementing a mechanism to mitigate the degradation of the decrease in quality of the multimedia data stream at the further UE.

Other exemplary embodiments are related to a user equipment (UE) having a transceiver and a processor. The transceiver is configured to connect to one or more wireless networks. The processor is configured to establish a multimedia data stream with a further UE, identify a predetermined condition, wherein the predetermined condition indicates a decrease in quality of the multimedia data stream at the further UE, and implement a mechanism to mitigate the degradation of the decrease in quality of the multimedia data stream at the further UE.

Still further exemplary embodiments are related to an integrated circuit. The integrated circuit includes circuitry configured to establish a multimedia data stream with a user equipment (UE), circuitry configured to identify a predetermined condition, wherein the predetermined condition indicates a decrease in quality of the multimedia data stream at the UE and circuitry configured to implement a mechanism to mitigate the degradation of the decrease in quality of the multimedia data stream at the UE.

DETAILED DESCRIPTION

Figure 1:
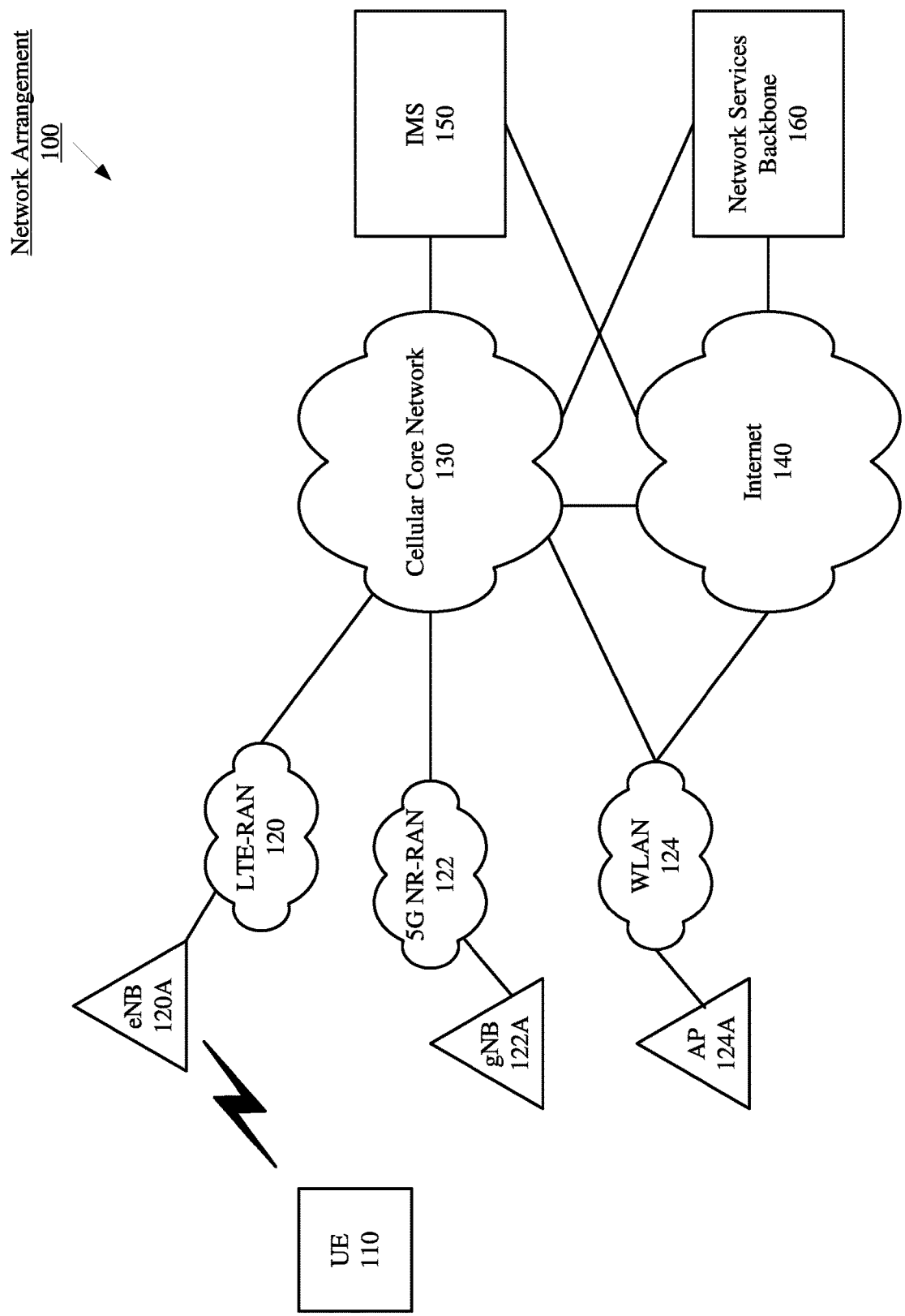
FIG. 1 shows an exemplary network arrangement according to various exemplary embodiments.

The exemplary embodiments may be further understood with reference to the following description and the related appended drawings, wherein like elements are provided with the same reference numerals. The exemplary embodiments describe various mechanisms for a user equipment (UE) to enhance delivery of a multimedia data stream to a remote endpoint (e.g., a further UE). These exemplary mechanisms improve the quality with which audio and/or video is perceived at the remote endpoint of the multimedia data stream.

The exemplary embodiments are described with regard to a UE. However, the use of a UE is merely for illustrative purposes. The exemplary embodiments may be utilized with any electronic component that may establish a connection with a network and is configured with the hardware, software, and/or firmware to exchange information and data with the network. Therefore, the UE as described herein is used to represent any electronic component.

The exemplary embodiments are also described with regard to the UE participating in a video call with a further UE. The video call may be performed using the real-time transport protocol (RTP). A person of ordinary skill in the art would understand that RTP refers to a data transfer protocol for delivering streaming multimedia data over IP based networks. For example, a connection may be established between two endpoints. In accordance with the RTP, multimedia data (e.g., audio, video, etc.) may be configured into an RTP packet and transmitted from a first endpoint to a second endpoint over an IP based network. However, reference to a video call and RTP is merely provided for illustrative purposes. The exemplary embodiments may apply to any scenario in which the UE is configured to stream multimedia data (e.g., audio, video, etc.) to a remote endpoint over a network. For instance, services such as, but not limited to, voice over long term evolution (VoLTE), video over LTE (ViLTE), real time gaming, 5G voice, 5G video, buffered streaming of video/audio and live streaming of video/audio may also include streaming of multimedia data.

To participate in the video call, the UE may communicate with a cellular network via a base station. For example, the cellular network may be a Long Term Evolution (LTE) network and the base station may be an Evolved Node B (eNB) or a 5G New Radio (NR) network with a next generation Node B (gNB). Any reference to a particular cellular network or a particular type of base station is merely provided for illustrative purposes. Those skilled in the art will understand that the cellular network may be any type of network and the base station may be any type of base station within the corresponding cellular network.

When connected to the cellular network, the UE may be configured to be in one of multiple of different operating states. One operating state may be characterized as RRC connected state. RRC refers to the radio resource control (RRC) protocols. Those skilled in the art will understand that when the UE is in RRC connected state, the UE and the cellular network may be configured to exchange information and/or data. The exchange of information and/or data may allow the UE to access various services normally available via the network connection. For example, when in the RRC connected state, the UE may register with the IP multimedia subsystem (IMS) via the cellular network. The IMS may be generally described as an architecture for delivering multimedia services to the UE using the IP protocol. The IMS may communicate with the core portion of the cellular network and the Internet to provide multimedia services to the UE. Accordingly, once registered, the UE may be configured to stream multimedia data to a further UE.

During the video call, the quality with which audio and/or video is output at the further UE may be affected by an event related to the UE's network connection and the UE's subsequent response to the event. To provide a general example, under conventional circumstances, when the UE experiences a connection issue with its currently camped base station during the video call, the UE may momentarily stop transmitting multimedia data. As a result, the audio and/or video output at the further UE may appear to glitch and lag. Accordingly, how the UE behaves under a certain set of conditions and/or in response to a particular event related to the UE's network connection may have a direct impact on the quality of the audio and/or video at the further UE. The exemplary embodiments relate to the UE implementing various mechanisms that mitigate the adverse effects that the UE may have on the quality of the audio and/or video that is output at the further UE.

FIG. 1 shows an exemplary network arrangement 100 according to various exemplary embodiments. The exemplary network arrangement 100 includes a UE 110. Those skilled in the art will understand that the UE 110 may be any type of electronic component that is configured to communicate via a network, e.g., mobile phones, tablet computers, desktop computers, smartphones, phablets, embedded devices, wearables, Internet of Things (IoT) devices, etc. It should also be understood that an actual network arrangement may include any number of UEs being used by any number of users. Thus, the example of a single UE 110 is merely provided for illustrative purposes.

The UE 110 may be configured to communicate with one or more networks. In the example of the network configuration 100, the cellular networks with which the UE 110 may wirelessly communicate are a LTE radio access network (LTE-RAN) 120 and a 5G New Radio (NR) radio access network (5G NR-RAN) 122. The UE 110 may also wirelessly communicate with a non-cellular network such as a wireless local access network (WLAN) 124. However, it should be understood that the UE 110 may also communicate with other types of networks and the UE 110 may also communicate with networks over a wired connection. Therefore, the UE 110 may include an LTE chipset to communicate with the LTE-RAN 120, a 5G NR chipset to communicate with the 5G NR-RAN 122 and an ISM chipset to communicate with the WLAN 124.

The LTE-RAN 120 and the 5G NR-RAN 122 may be portions of cellular networks that may be deployed by cellular providers (e.g., Verizon, AT&T, Sprint, T-Mobile, etc.). These networks 120, 122 may include, for example, cells or base stations (Node Bs, eNodeBs, HeNBs, eNBS, gNBs, gNodeBs, macrocells, microcells, small cells, femtocells, etc.) that are configured to send and receive traffic from UEs that are equipped with the appropriate cellular chip set.

The UE 110 may connect to the LTE-RAN 120 via an evolved Node B (eNB) 120A. Those skilled in the art will understand that any association procedure may be performed for the UE 110 to connect to the LTE-RAN 120. For example, as discussed above, the LTE-RAN 120 may be associated with a particular cellular provider where the UE 110 and/or the user thereof has a contract and credential information (e.g., stored on a SIM card). Upon detecting the presence of the LTE-RAN 120, the UE 110 may transmit the corresponding credential information to associate with the LTE-RAN 120. More specifically, the UE 110 may associate with a specific base station (e.g., the eNB 120A of the LTE-RAN 120). As mentioned above, the use of the LTE-RAN 120 is for illustrative purposes and any type of network may be used. For example, the UE 110 may also connect to the 5G NR-RAN 122 via the next generation Node B (gNB) 122A.

The WLAN 124 may include any type of wireless local area network (WiFi, Hot Spot, soft AP, IEEE 802.11 networks, etc.). WLANs may manage access to the network via any of a plurality of different hardware devices that are configured to send and/or receive traffic from UEs that are equipped with the appropriate ISM chipset. In the exemplary network arrangement 100, the UE 110 may connect to the WLAN 124 via an access point (AP) 124A. However, reference to an AP is merely provided for illustrative purposes. The exemplary embodiments may apply to any type of device that manages access to a WLAN.

In addition to the networks 120, 122 and 124 the network arrangement 100 also includes a cellular core network 130, the Internet 140, an IP Multimedia Subsystem (IMS) 150, and a network services backbone 160. The cellular core network 130 may be considered to be the interconnected set of components that manages the operation and traffic of the cellular network. The cellular core network 130 also manages the traffic that flows between the cellular network and the Internet 140. The IMS 150 may be generally described as an architecture for delivering multimedia services to the UE 110 using the IP protocol. The IMS 150 may communicate with the cellular core network 130 and the Internet 140 to provide the multimedia services to the UE 110. The network services backbone 160 is in communication either directly or indirectly with the Internet 140 and the cellular core network 130. The network services backbone 160 may be generally described as a set of components (e.g., servers, network storage arrangements, etc.) that implement a suite of services that may be used to extend the functionalities of the UE 110 in communication with the various networks.

Figure 2:
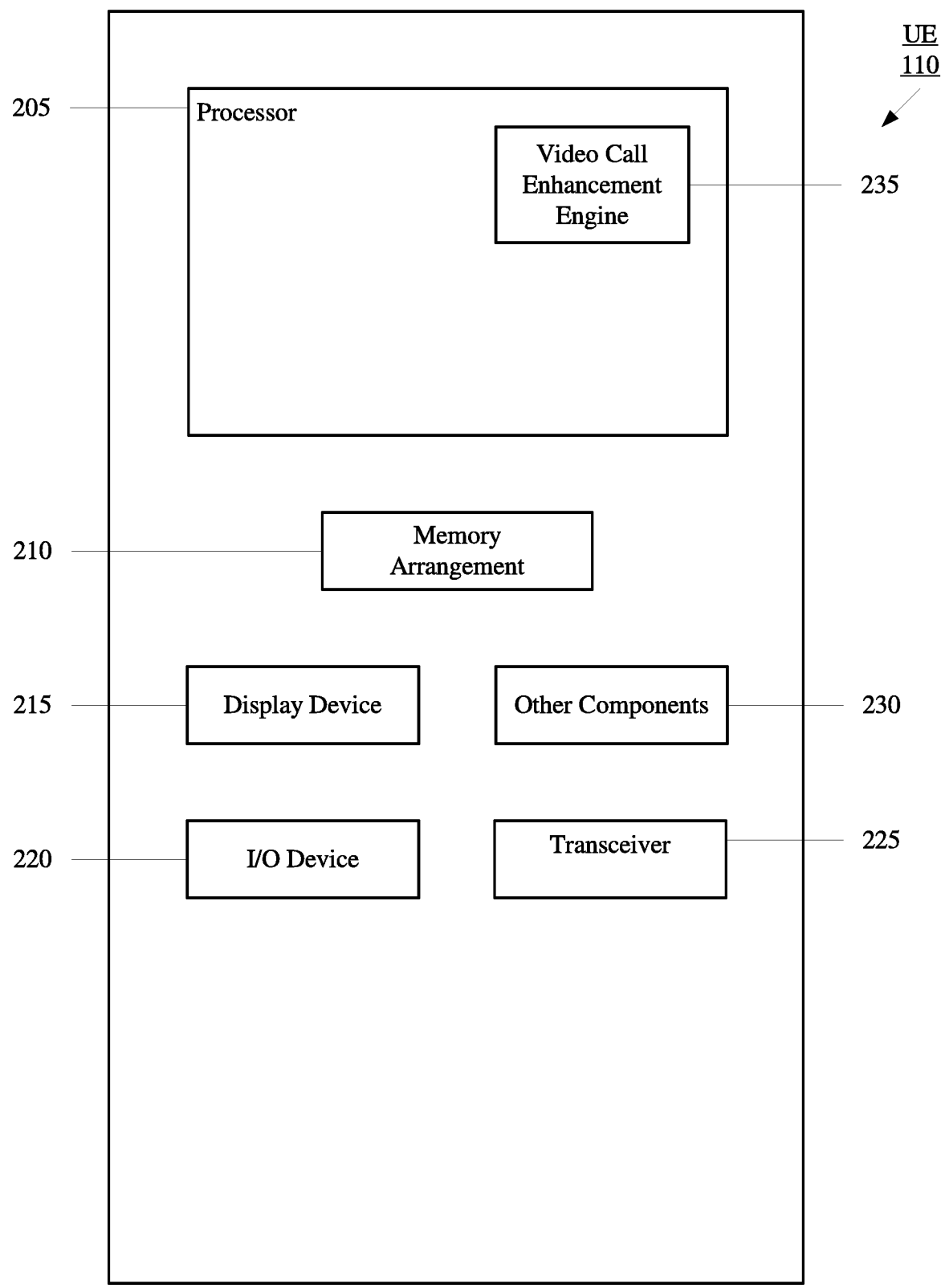
FIG. 2 shows an exemplary UE according to various exemplary embodiments.

FIG. 2 shows an exemplary UE 110 according to various exemplary embodiments. The UE 110 will be described with regard to the network arrangement 100 of FIG. 1. The UE 110 may represent any electronic device and may include a processor 205, a memory arrangement 210, a display device 215, an input/output (I/O) device 220, a transceiver 225, and other components 230. The other components 230 may include, for example, an audio input device, an audio output device, a battery that provides a limited power supply, a data acquisition device, ports to electrically connect the UE 110 to other electronic devices, sensors to detect conditions of the UE 110, etc.

The processor 205 may be configured to execute a plurality of engines of the UE 110. For example, the engines may include a video call enhancement engine 235. During a video call with a further UE, the video call enhancement engine 235 may be configured to monitor for various predetermined conditions related to the network connection of the UE 110 that may indicate that the perceived quality of the audio and/or video at the further UE has been or will likely be negatively impacted. If a predetermined condition is identified, the video call enhancement engine 235 may implement a mechanism to mitigate the degradation of quality of the audio and/or video at the further UE.

The above referenced engines being an application (e.g., a program) executed by the processor 205 is only exemplary. The functionality associated with the engines may also be represented as a separate incorporated component of the UE 110 or may be a modular component coupled to the UE 110, e.g., an integrated circuit with or without firmware. For example, the integrated circuit may include input circuitry to receive signals and processing circuitry to process the signals and other information. The engines may also be embodied as one application or separate applications. In addition, in some UEs, the functionality described for the processor 205 is split among two or more processors such as a baseband processor and an applications processor. The exemplary embodiments may be implemented in any of these or other configurations of a UE.

The memory 210 may be a hardware component configured to store data related to operations performed by the UE 110. The display device 215 may be a hardware component configured to show data to a user while the I/O device 220 may be a hardware component that enables the user to enter inputs. The display device 215 and the I/O device 220 may be separate components or integrated together such as a touchscreen. The transceiver 225 may be a hardware component configured to establish a connection with the LTE-RAN 120, the 5G NR-RAN 122, the WLAN 124, etc. Accordingly, the transceiver 225 may operate on a variety of different frequencies or channels (e.g., set of consecutive frequencies).

Figure 3:
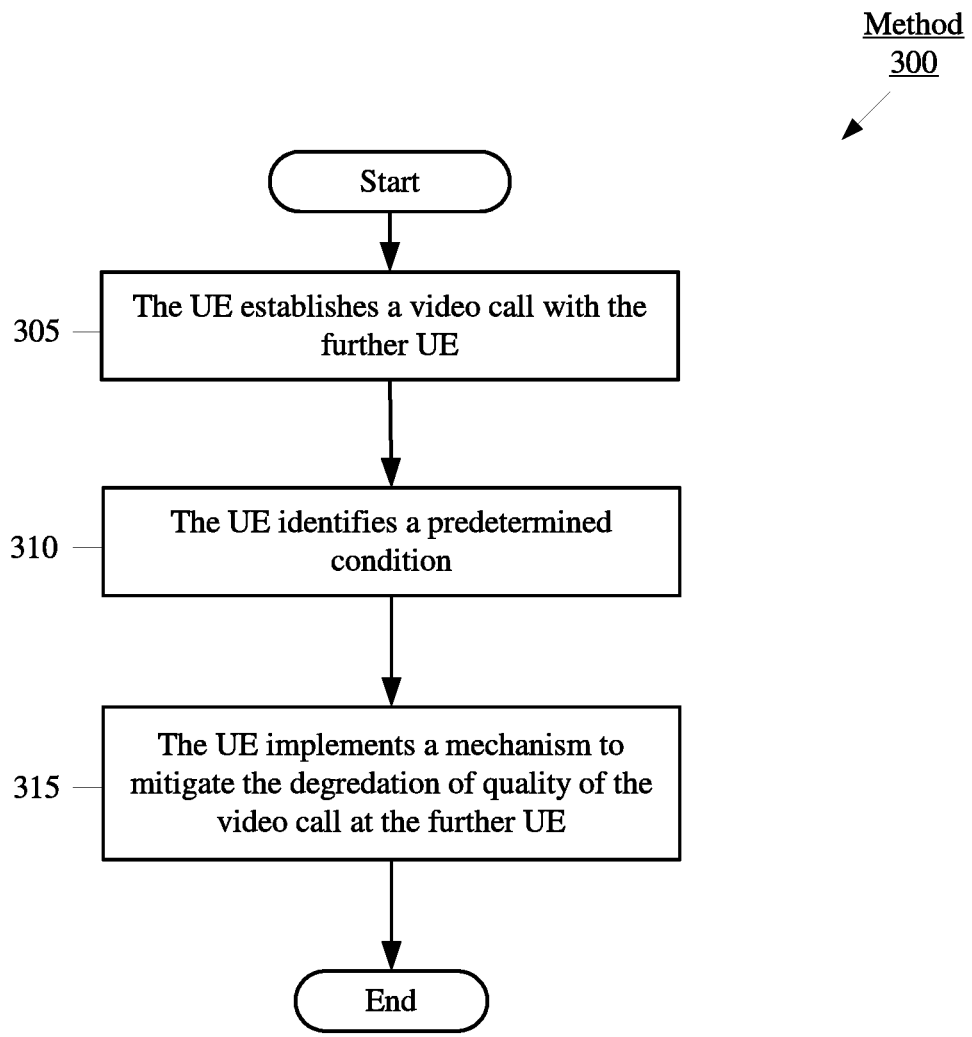
FIG. 3 shows an exemplary method for the UE to implement a mechanism to mitigate the degradation of quality of a multimedia data stream at a remote endpoint according to various exemplary embodiments.

FIG. 3 shows an exemplary method 300 for the UE 110 to implement a mechanism to mitigate the degradation of quality of a multimedia data stream at a remote endpoint according to various exemplary embodiments. The method 300 will be described with regard to the network arrangement 100 of FIG. 1 and the UE 110 of FIG. 2.

In 305, the UE 110 establishes a video call with a further UE. To provide a general example of the various signaling and protocol stack related operations that may be performed by the UE 110, consider the following exemplary aspects of establishing a video call. However, as mentioned above, the exemplary embodiments are not limited to a video call and may apply to any scenario in which the UE 110 is configured to transmit a multimedia data stream to a remote endpoint.

Initially, the UE may be camped on the eNB 120A of the LTE-RAN 120. When connected to the LTE-RAN 120, the UE 110 may be configured to be in one of multiple of different operating states. One operating state may be characterized as RRC idle state and another operating state may be characterized as RRC connected state. Those skilled in the art will understand that when the UE 110 is in RRC connected state, the UE 110 and the LTE-RAN 120 may be configured to exchange information and/or data. The exchange of information and/or data may allow the UE 110 to perform functionalities available via the network connection. Further, those skilled in the art will understand that when the UE 110 is connected to the LTE-RAN 120 and in RRC idle state the UE 110 is generally not exchanging data with the network and radio resources are not being assigned to the UE 110 within the network. However, when the UE 110 is in RRC idle state, the UE 110 may monitor for information and/or data transmitted by the network. Those skilled in the art will understand that the RRC idle and connected states are terms associated with an LTE network. Throughout this description these terms are being used generally to describe states the UE 110 may be in when connected to any network and that exhibit the characteristics described above for the RRC idle and RRC connected states.

When the UE 110 is in an RRC idle state, the UE 110 may not be able to exchange data with the network. To exchange data with the network the UE 110 may transition from the RRC idle state to the RRC connected state. For example, while in RRC idle state the UE 110 may listen for information such as but not limited to, primary synchronization signals (PSS) and secondary synchronization signals (SSS), Master Information Block (MIB), broadcast messages, System Information Block (SIB), paging messages, etc. In response, the UE 110 may issue a request to the network that indicates the UE 110 wants to be moved to the RRC connected state. A successful transition from the RRC idle state to the RRC connected state may include the exchange of messages between the UE 110 and eNB 120A of the LTE-RAN 120. In the RRC connected state, a network context may be established between the eNB 120A of the LTE-RAN 120 and the UE 110. Thus, the UE 110 may be assigned radio resources and the UE 110 may be able to exchange data with the network after an access stratum (AS) security context has been established. Transitioning from an RRC connected state to an RRC idle state may be referred to as RRC connection release and transitioning from an RRC idle state to an RRC connected state may be referred to as RRC connection setup or RRC connection reestablishment. However, reference to RRC connection setup, RRC connection reestablishment and RRC connection release is merely provided for illustrative purposes. Other networks may refer to similar operations by different names.

The exemplary embodiments are not limited to RRC connected state and RRC idle state. For example, when the UE 110 is camped on the gNB 122A of the 5G NR-RAN 122, the UE 110 may be configured to be in an RRC inactive state. The RRC inactive state may be considered to be a state between the Connected and Idle states. In RRC inactive mode, the UE 110 maintains an RRC connection while minimizing signaling and power consumption. This allows the UE 110 to quickly switch back to connected state when necessary. As described above, reference to any particular operating state is merely provided for illustrative purposes, the exemplary embodiments may apply to any suitable operating state for the UE 110. For example, the exemplary embodiments may include keeping the UE 110 in the inactive state when a video call is active over WiFi and first threshold criteria is met as will be described in greater detail below.

Various signaling may take place after the UE 110 has successfully transitioned to an RRC connected state. For example, to obtain Non-Access Stratum (NAS) services from the network (e.g. internet connectivity), network entities beyond the base station may be aware of the presence of the UE 110 to provide the bearers that enable the UE 110 to utilize these services. This may include the UE 110 communicating with various network entities such as the Mobility Management Entity (MME) (e.g. via the currently camped base station). Connecting to the MME may be achieved by an attach procedure. Once the attach procedure is successfully completed, a context is established for the UE 110 in the MME and the corresponding default bearers are established. After the attach procedure is complete the UE 110 may be registered with the LTE-RAN 120.

Using the default bearers, the UE 110 may perform various signaling to register with the IMS 150. The IMS 150 may be generally described as an architecture for delivering multimedia services to the UE 110 using the IP protocol. The IMS 150 may communicate with the cellular core network 130 and the Internet 140 to provide the multimedia services to the UE 110. Once registered with the IMS 150, the UE 110 may perform signaling with the further UE to establish a video call as a mobile originating (MO) endpoint or a mobile terminating (MT) endpoint.

The signaling between the UE 110 and the further UE may be in accordance with the session initiation protocol (SIP). Upon completion of the SIP signaling, dedicated bearers are established that may be used to transport multimedia data (e.g., the video call) between the UE 110 and the further UE. The multimedia data stream may be used in conjunction with the RTP control protocol (RTCP). While RTP packets are used for payload data, RTCP packets may be used to provide feedback, control information and/or statistics to the other endpoint and/or network. The RTCP packets may be used to satisfy the quality of service (QoS) requirements for the multimedia data stream. Further, the RTCP packets may be delivered over a different channel and/or bearer than the RTP packets.

The various signaling and protocol stack related operations that are mentioned above are merely provided as a general example of the types of signaling and operations that may be included in establishing and maintaining the video call. However, as mentioned above, the exemplary embodiments are not limited to a video call and may apply to any scenario in which the UE 110 is configured to provide a multimedia data stream to a remote endpoint.

Returning to the method 300, in 310 the UE 110 identifies a predetermined condition. The predetermined condition may indicate to the UE 110 that the perceived quality of the audio and/or video at the further UE has been or will likely be negatively impacted.

The predetermined condition may include an indication that an inter-radio access technology (iRAT) handover is likely. While the above exemplary scenario discusses the UE 110 establishing the video call while camped on a base station of a cellular network, the UE 110 may be connected to the WLAN 124 via the AP 124A at any point during the video call. Under conventional circumstances, when a handover of the UE 110 is performed from the WLAN 124 to a cellular network (e.g., LTE-RAN 120, 5G NR-RAN 122, etc.) during the video call, the UE 110 may momentarily stop the transmission of multimedia data which may cause the audio and/or video of the video call to glitch or lag. For example, the UE 110 may not transmit any data while the RRC connected state is being established and the necessary bearers and/or context is being established for the UE 110 to continue the video call on the cellular network.

The predetermined condition may also include an indication of a connection issue between the UE 110 and the currently camped base station. Throughout this description a connection issue may refer to any instance where the UE 110 is configured to camp on a particular base station and the UE 110 experiences no service or limited service where the UE 110 cannot perform the full scope of functionalities normally available to the UE 110 via the network connection. The connection issue may be the result of an action or inaction by the UE 110, a base station, a network entity or a combination thereof. The connection issue may be caused by any of a plurality of factors, such as but not limited to, the UE's location, signal strength, noise, interference, network congestion, network configuration, radio link failure (RLF), an attempt to camp on a cell fails, a handoff procedure fails, protocol stack requirements, failure of an RRC procedure, the connection is released, lack of response to a service request, beam failure, beam recovery failure, etc. It should be noted that the connection issue may refer to the connection between the UE 110 and a cellular network or the UE 110 and the WLAN 124.

Under conventional circumstances, in response to a connection issue that occurs during a video call, the UE 110 may either momentarily stop the transmission of multimedia data or alter parameters related to how the multimedia data is to be transmitted by the UE 110. This type of behavior by the UE 110 may cause the audio and/or video of the video call to glitch and lag. Accordingly, the predetermined condition may also include an indication of the UE 110 behavior that is indicative of a decrease in perceived quality of the audio and/or video at the further UE. For example, these indications may relate to a change in a setting/parameter related to the transmission of the multimedia data or a predetermined amount of time in which no multimedia data has been transmitted by the UE 110.

Figure 4:
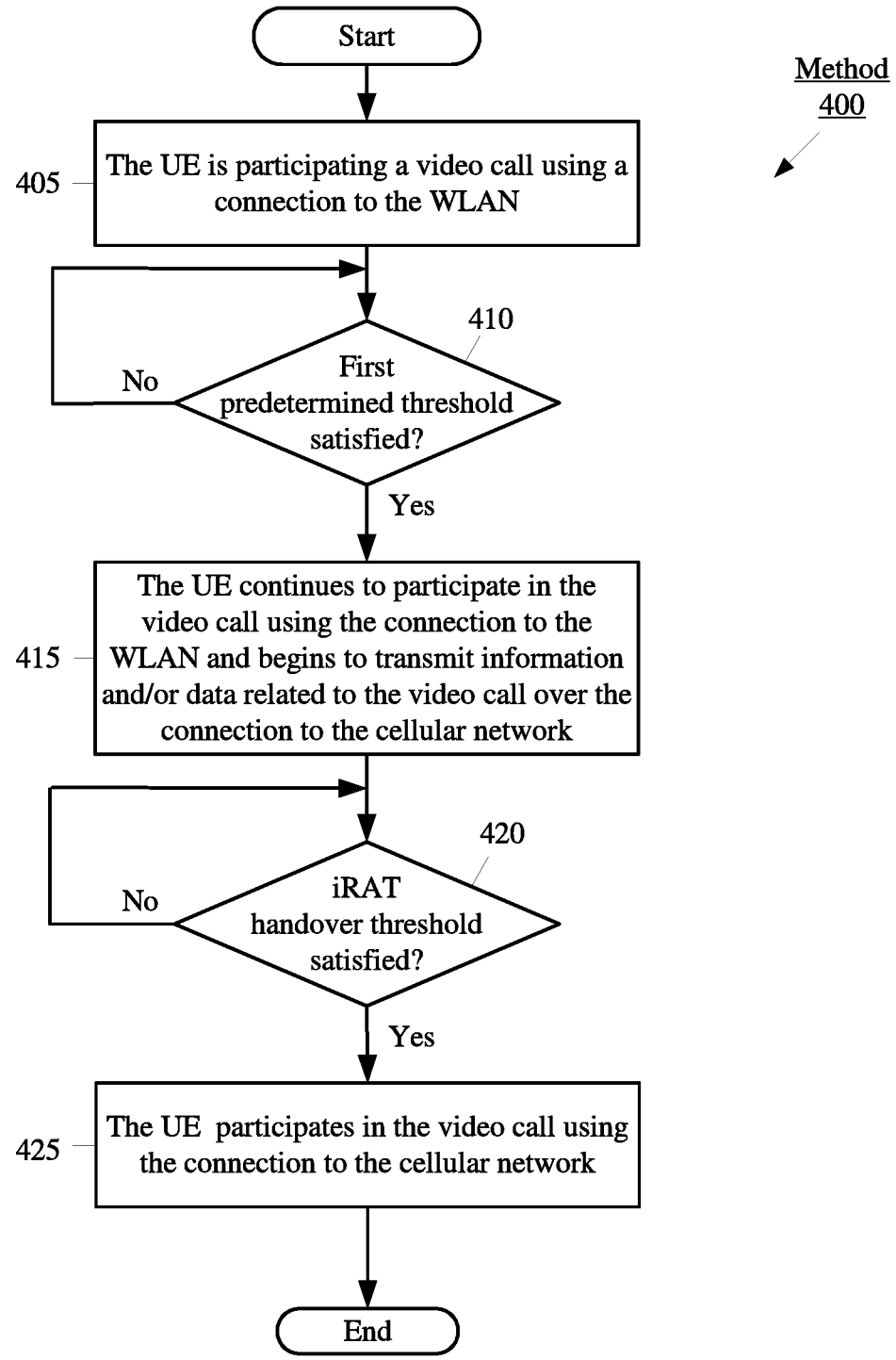
FIG. 4 shows an exemplary method for the UE to implement a mechanism to mitigate the degradation of quality associated with an iRAT handover according to various exemplary embodiments.
Figure 5:
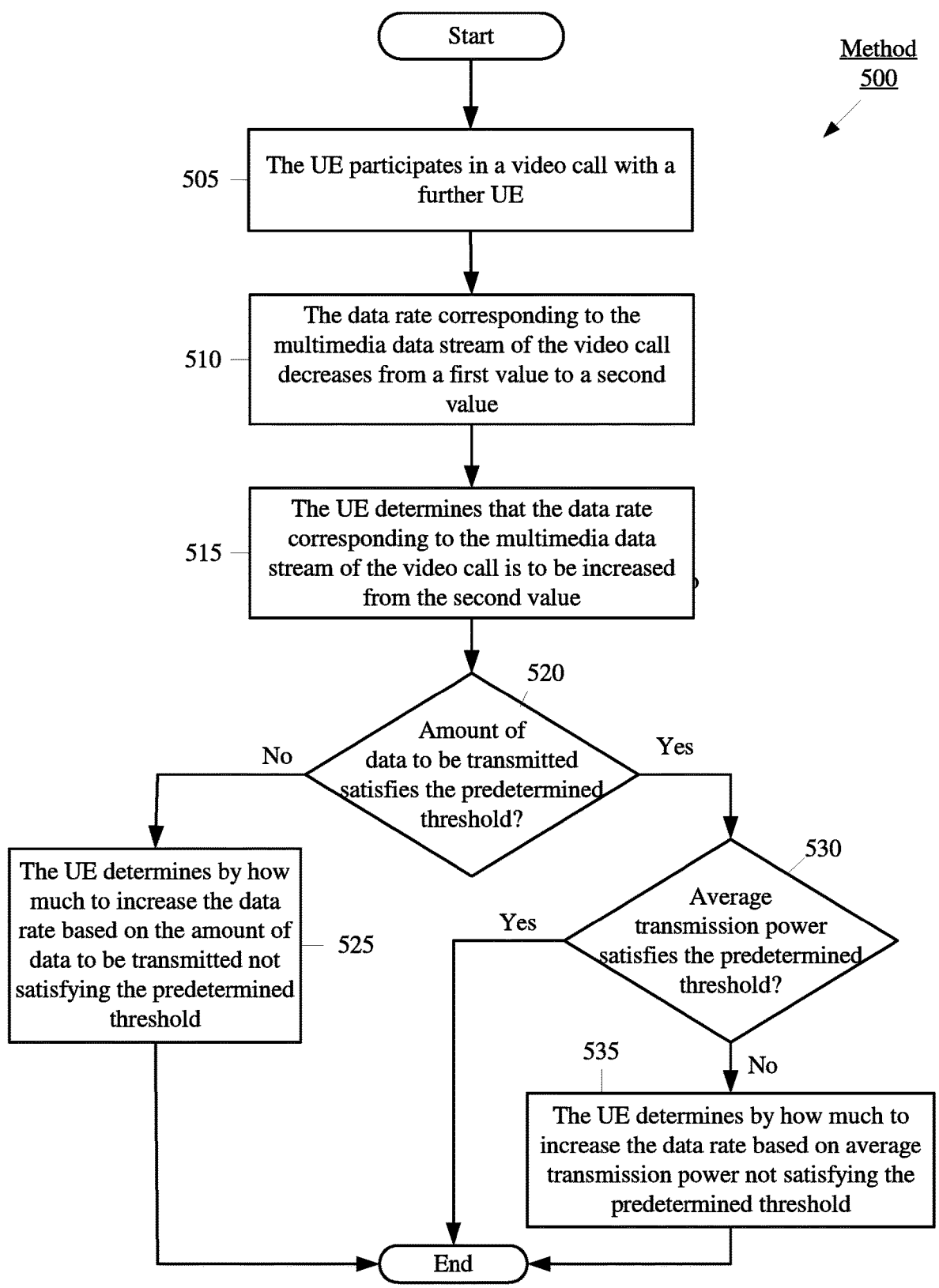
FIG. 5 shows an exemplary method for the UE to implement a mechanism to mitigate the degradation of quality associated with a connection issue according to various exemplary embodiments.

In 315, the UE 110 implements a mechanism to mitigate the degradation of quality of the video call at the further UE. The mechanism may be implemented based on the type of predetermined condition identified. FIG. 4 will describe how the UE 110 mitigates the degradation of quality of the video call at the further UE when the predetermined condition indicates an iRAT handover is likely. FIG. 5 will describe how the UE 110 mitigates the degradation of quality of the video call at the further UE when the predetermined condition relates to a connection issue with the currently camped base station.

FIG. 4 shows an exemplary method 400 for the UE 110 to implement a mechanism to mitigate the degradation of quality associated with an iRAT handover according to various exemplary embodiments. The method 400 will be described with regard to the network arrangement 100 of FIG. 1, the UE 110 of FIG. 2 and the method 300 of FIG. 3. An iRAT handover may be any handover between different types of networks, e.g., WLAN to cellular, a first cellular type to a second cellular type (LTE to 5G or vice versa), etc. In the example of method 400, the iRAT handover will be described with regard to a WLAN to cellular network handover but the method 400 may be implemented for any type of iRAT handover.

In 405, the UE 110 is participating in a video call using a connection to the WLAN 124. In this example, the UE 110 initially establishes the video call with the further UE 110 when connected to the AP 124A of the WLAN 124. However, the exemplary embodiments are not limited to this type of scenario and may apply to any scenario in which the UE 110 is connected to any type of WLAN (e.g., WiFi, Hot Spot, soft AP, IEEE 802.11 networks, etc.) at any point during the video call.

When the UE 110 is participating in the video call using the connection to the WLAN 124, the UE 110 may also be camped on a base station of a cellular network (e.g., eNB 120A of the LTE-RAN 120) in the RRC idle state. Accordingly, an iRAT handover from the WLAN 124 to the currently camped cellular network may occur during the video call when the WiFi radio conditions degrade. Under conventional circumstances, in response to the iRAT handover, the UE 110 may momentarily stop the transmission of multimedia data while the transition from RRC idle state to RRC connected state occurs and while the necessary AS security context, bearers/context between the UE 110 and the cellular network are established. As mentioned above, momentarily stopping the transmission of the multimedia data during the video call may cause the audio and/or video at the further UE to glitch.

During operation, the iRAT handover is typically triggered based on measurement data collected by the UE 110. In this example, the measurement data will be described as relating to received signal strength indicator (RSSI), a parameter related to channel congestion and RTP based metrics (e.g., packet loss rate, delay, jitter, etc.) as well as video metrics (e.g., percentage of time video stalled, etc.). The parameter related to channel congestion may be based on factors such as, but not limited to, clear channel assessment (CCA), network allocation vector (NAV), energy detection, carrier sensing or any combination thereof. However, the exemplary embodiments are not limited to these parameters, an iRAT handover may be initiated based on any appropriate parameter. Accordingly, the iRAT handover may occur based on a comparison of at least one parameter to a predetermined threshold. Throughout this description, a threshold that is configured to trigger an iRAT handover of the UE 110 from the WLAN 124 to a cellular network will be referred to as an iRAT handover threshold.

In 410, the UE 110 determines whether a first predetermined threshold is satisfied. The first predetermined threshold may indicate to the UE 110 that the current conditions of the WLAN 124 are adequate for the voice call to continue but after further degradation may be inadequate and thus, the iRAT handover threshold may soon be satisfied. Accordingly, the first predetermined threshold may be associated with the predetermined condition 310 of the method 300 and indicate to the UE 110 that an iRAT handover is likely. For example, if the iRAT handover threshold is based on an RSSI value of −85 decibels (dB) the first predetermined threshold may be an RSSI value of −70 dB. If the iRAT handover threshold is based on a parameter related to channel congestion with a value of 80% the first predetermined threshold may be 70%. If the iRAT threshold value if based on an RTP packet loss with a value of 20% the first predetermined threshold may be 10%. However, any reference to either the first predetermined threshold or the iRAT handover threshold being a particular parameter or value is merely provided for illustrative purposes. The exemplary embodiments may apply to the first predetermined threshold and the iRAT handover threshold being any appropriate parameter of any appropriate value.

If the first predetermined threshold is satisfied the method 400 may continue to 415. If the predetermined threshold is not satisfied the method 400 may return to 410 where the UE 110 continues to determine whether the first predetermined threshold is satisfied.

In 415, the UE 110 continues participating in the video call using the connection to the WLAN 124 and begins to transmit information and/or data related to the video call over the connection to the cellular network. Accordingly, the UE 110 transitions from the RRC idle state to the RRC connected state. Further, the UE 110 and the cellular network also establish the bearers and context required to participate in the video call over the cellular network. In one exemplary embodiment, the UE 110 may achieve this by duplicating the video call data and transmitting the video call data over both the connection to the WLAN 124 and the connection to the LTE-RAN 122. In another exemplary embodiment, instead of duplicating all of the video call data, the UE 110 may achieve this by transmitting RTCP packets over the cellular network connection. As mentioned above, RTCP packets may be used to provide feedback, control information and/or statistics to the other endpoint and/or network.

At this stage, the UE 110 is participating in the video call using the connection to the WLAN 124. However, the UE 110 is also camped on the base station of the cellular network in the RRC connected state and the necessary bearers/context have been established to perform the video call over the cellular network. Accordingly, unlike conventional approaches that may not configure the cellular network connection for the video call until after the iRAT handover has been triggered, the exemplary embodiments configure the cellular network connection for the video call before the iRAT handover occurs. This enables the UE 110 to avoid behaving in a manner that causes the audio and/or video quality at the further UE to glitch or lag. Accordingly, the operations performed in 415 may be associated with the mechanism implemented in 315 of the method 300.

Returning to the method 400, in 420, the UE 110 determines whether the iRAT handover threshold is satisfied. If the iRAT handover threshold is satisfied, the method 400 continues to 425. In 425, the UE 110 participates in the video call using the connection to the cellular network. If the iRAT handover threshold is not satisfied, the method 400 may return to 420 where the UE 110 continues to determine whether the iRAT handover threshold is satisfied.

In one exemplary embodiment, if the UE 110 transmits RTCP packets over the connection to the cellular network in 415, when the iRAT handover threshold is satisfied in 420 the UE 110 may duplicate the video call data over both the WLAN 124 connection and the cellular connection prior to initiating the iRAT handover. Accordingly, in this example, at a first time, the UE 110 may participate in the video call using the connection to the WLAN 124 while transmitting RTCP packets over the cellular connection. At a second time, the UE 110 may duplicate the video call data over both the WLAN 124 connection and the cellular connection. Subsequently, at a third time, the UE 110 may participate in the video call using the cellular connection.

While the first predetermined threshold of 410 and the iRAT handover threshold of 420 may be based on the same parameters it is not required. For example, the first predetermined parameter may be based on RSSI and/or the parameter related to channel congestion while the iRAT handover threshold is based on an RTP based metric (e.g., packet loss rate, delay, jitter, video metrics, etc.).

When performing method 400, if the UE 110 identifies that the first predetermined threshold is no longer satisfied for a particular duration and an iRAT handover has not occurred, the UE 110 may stop transmitting data and/or information (e.g., RTCP control packets) over the cellular network. There is a certain cost to the UE 110 to transmit data to both networks (e.g., power, processing resources, co-existence interference concerns, etc.). Thus, if the UE 110 determines that an iRAT handover is no longer imminent (e.g., by determining the first predetermined threshold is no longer satisfied), the UE 110 may discontinue the dual transmissions.

As mentioned above, under conventional circumstances, when a connection issue occurs during the video call the UE 110 may either momentarily stop the transmission of multimedia data or alter parameters related to how the multimedia data is to be transmitted by the UE 110. To provide an example of parameters related to how the multimedia data is to be transmitted by the UE 110 consider the following exemplary aspects of providing a multimedia data stream to a remote endpoint.

To transmit the multimedia data, the baseband processor of the UE 110 may utilize a codec. The codec may be responsible for encoding data for transmission and may be configured to operate in accordance with any applicable standard (e.g., high efficiency video coding (HEVC)). Accordingly, the codec may be configured to utilize any of a plurality of different video codec tiers. Each tier may be associated with a set of constraints that are to be applied to the multimedia data stream. These constraints may include parameters such as, but not limited to, data rate, encoding rate, packet size, video resolution, video frame rate, aspect ratio, video format, etc. Accordingly, the video codec tier implemented by the UE 110 is associated with various parameters that are used by the UE 110 when transmitting the multimedia data stream. Thus, when a video codec tier is changed from a first tier to a second tier, at least one parameter related to the transmission of the multimedia data stream is altered.

Generally, the hierarchy of the video codec tiers are associated with the quality with which the audio and/or video data is perceived at the further UE. For example, as the video codec tiers increase, the data rate implemented by the UE 110 may increase. Thus, the highest video codec tier would generally provide the highest quality at the further UE.

The actual video codec tier implemented by the codec may be based on any of a variety of different factors and may change during the video call. For example, the hardware, software and/or firmware of the UE 110 and the further UE may be capable of supporting a subset of the video codec tiers. Other factors may include, but are not limited to, the amount of data in the baseband buffer of the UE 110 that is to be transmitted, measurement data corresponding to the wireless environment (e.g., cellular or WLAN) of the UE 110, measurement data corresponding to the wireless environment of the further UE and feedback received from the further UE. Any reference to a video codec tier is merely provided for illustrative purposes, different entities may refer to similar concepts by a different name. The exemplary embodiments may apply to a codec that is configured to alter a parameter corresponding to the multimedia data stream during the video call in any appropriate manner.

When a connection issue occurs, the UE 110 may alter the video codec tier from a first tier to a lower tier. While lowering the video codec tier may sacrifice quality of the video call at the further UE, it increases the likelihood that the multimedia data stream will reach the base station and thus, the further UE. In response to certain connection issues, instead of lowering the video codec tier, the UE 110 may momentarily stop the transmission of the multimedia data. When the connection is recovered, the video codec tier may then increase until the best possible video codec tier is being utilized for the video call.

FIG. 5 shows an exemplary method 500 for the UE 110 to implement a mechanism to mitigate the degradation of quality associated with a connection issue according to various exemplary embodiments. The method 500 will be described with regard to the network arrangement 100 of FIG. 1, the UE 110 of FIG. 2 and the method 300 of FIG. 3.

The exemplary method 500 will be described with regard to altering the data rate corresponding to the multimedia data stream of the video call. A person of ordinary skill in the art would understand that altering the data rate may be associated with a change in the video codec tier. Generally, the higher the data rate at the UE 110 the better the quality of the audio and/or video at the further UE.

In 505, the UE 110 participates in a video call with a further UE. In this example, the UE 110 is camped on the eNB 120A of the LTE-RAN 120. However, the exemplary method 500 may apply to the UE 110 being camped on any type of cellular network or any type of WLAN.

In 510, the data rate corresponding to the multimedia data stream of the video call decreases from a first value to a second value. This decrease in data rate may be associated with the predetermined condition 310 of the method 300 and thus, may indicate that the perceived quality of the audio and/or video at the further UE has been or will likely be negatively impacted.

To provide an example, the UE 110 may experience a connection issue with the eNB 120A. In response to the connection issue, the UE 110 may alter parameters (e.g., the data rate) corresponding to the multimedia data stream. While this may sacrifice the perceived quality of the audio and/or video of the video call at the further UE, the UE 110 may lower the data rate to ensure that the data being transmitted by the UE 110 reaches the eNB 120A and thus, the further UE. However, the exemplary embodiments are not limited to a connection issue and may apply to any scenario in which the data rate of the multimedia data stream is decreased.

In certain exemplary embodiments, instead of stopping the transmission of the multimedia data stream, the UE 110 may utilize the lowest available video codec tier (e.g., data rate). Accordingly, in 510, when the UE 110 encounters a connection issue that would, under conventional circumstances, cause the UE 110 to momentarily stop the transmission of data, the UE 110 would instead implement the lowest available video codec tier (e.g., data rate). This may increase the likelihood that at least some audio and/or video data makes it to the further UE and thus, decrease the severity of any perceived glitches that may occur. Accordingly, utilizing the lower available video codec tier instead of momentarily stopping the transmission of data may be a mechanism implemented in 315 of the method 300.

In 515, the UE 110 determines that the data rate corresponding to the multimedia data stream of the video call is to be increased from the second value. 520-535 will describe how the UE 110 determines by how much the data rate is to be increased. The determination in 515 may be based on any indication that a higher data rate may be implemented. For example, the UE 110 may determine that based on at least one of the baseband buffer or feedback from the further UE a data rate higher than the second value may be utilized.

In 520, the UE 110 determines whether an amount of data to be transmitted over a time window satisfies a predetermined threshold. If over the time window (e.g., 50 millisecond (ms), 100 ms, 200 ms, etc.) the UE 110 determines that the amount of data to be transmitted does not satisfy the predetermined threshold, this may indicate that the uplink timeline is relatively unoccupied. An unoccupied uplink timeline may indicate that there are available resources in the uplink and thus, the data rate may be increased. Increasing the data rate based on this determination may be a mechanism implemented in 315 of the method 300. To make this determination the UE 110 may consider factors such as, but not limited to, baseband queue depth, the current data rate and the uplink projected trajectory. The uplink projected trajectory may relate to the expected uplink timeline and thus, indicate an amount of data to be transmitted by the UE 110 over the network connection. To determine the uplink projected trajectory, the video call enhancement engine 235 may collect information from various protocol stack layers such as, but not limited to, the medium access control (MAC) layer and the transmission control protocol (TCP)/IP layer. The video call enhancement engine 235 may also reference the buffer status report (BSR). If the predetermined threshold is satisfied in 520, the method 500 continues to 525.

In 525, the UE 110 determines by how much to increase the data rate based on the amount of data to be transmitted not satisfying the predetermined threshold. As mentioned above, this may indicate that the uplink RF timeline is relatively unoccupied. Accordingly, the UE 110 knows that there are or will be available resources in the uplink and thus, the data rate may be increased by an amount that would cause the uplink timeline to at least be closer to the predetermined threshold utilized 520. Subsequently, the method 500 ends.

Returning to 520, if over the time window the UE 110 determines that the amount of data to be transmitted satisfies the predetermined threshold, this may indicate that the uplink timeline is mostly occupied. When the predetermined threshold is not satisfied in 520, the method 500 continues to 530.

In 530, the UE 110 determines whether the average transmission power satisfies a predetermined threshold. If the predetermined threshold is not satisfied, the method 500 continues to 535. If the predetermined threshold is satisfied, the method 500 ends. When the average transmission power does satisfy the predetermined threshold, this may indicate to the UE 110 that despite the uplink timeline being mostly occupied the data rate may be increased. To provide an example, during operation, the video call enhancement engine 235 may monitor the power headroom parameter. Those skilled in the art would understand that power headroom is equal to the difference between maximum transmission power and physical uplink shared channel (PUSCH) power on a per subframe basis. When power headroom is a positive value, this may indicate that the transmission power being utilized by the UE 110 is not exceeding the maximum transmission power and thus, the UE 110 is capable of transmitting more data. Accordingly, if the video call enhancement engine 235 identifies that over a time window the PUSCH power being utilized by the UE 110 is resulting in a power headroom parameter with a positive value, this may provide an indication that the data rate may be increased. However, reference to power headroom is merely provided for illustrative purposes, the exemplary embodiments may utilize any parameter related to transmission power. Increasing the data rate based on this determination may be a mechanism implemented in 315 of the method 300.

In 535, the UE 110 determines by how much to increase the data rate based on the average transmission power satisfying the predetermined threshold.

Those skilled in the art will understand that the above-described exemplary embodiments may be implemented in any suitable software or hardware configuration or combination thereof. An exemplary hardware platform for implementing the exemplary embodiments may include, for example, an Intel x86 based platform with compatible operating system, a Windows OS, a Mac platform and MAC OS, a mobile device having an operating system such as iOS, Android, etc. In a further example, the exemplary embodiments of the above described method may be embodied as a program containing lines of code stored on a non-transitory computer readable storage medium that, when compiled, may be executed on a processor or microprocessor.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

It will be apparent to those skilled in the art that various modifications may be made in the present disclosure, without departing from the spirit or the scope of the disclosure. Thus, it is intended that the present disclosure cover modifications and variations of this disclosure provided they come within the scope of the appended claims and their equivalent.

What is claimed:

1. A method, comprising:
   at a user equipment (UE) configured with a wireless network connection:
   establishing a multimedia data stream with a further UE;
   identifying a predetermined condition, wherein the predetermined condition indicates a decrease in quality of the multimedia data stream at the further UE, the predetermined condition including identifying a first measurement data that satisfies a first predetermined threshold;
   implementing a mechanism based on the predetermined condition comprising:
   transmitting the multimedia data stream as a real-time transport protocol (RTP) to the further UE via the wireless network connection based on the first measurement data;
   transmitting a real-time transport control protocol (RTCP) packet to the further UE over a cellular network connection via a currently camped base station based on the first measurement data, wherein the transmission of the RTCP packet enables the multimedia data stream to continue over the cellular network connection; and
   identifying that the first predetermined threshold is no longer satisfied for a time window and an inter-radio access technology (iRAT) handover has not occurred, wherein the mechanism controls the decrease in quality of the multimedia data stream at the further UE.

2. The method of claim 1, wherein the wireless network connection is a wireless local area network (WLAN) connection and the predetermined condition relates to the inter-radio access technology (iRAT) handover.

3. The method of claim 1, wherein the mechanism comprises:
   identifying second measurement data satisfies a second predetermined threshold, wherein the iRAT handover from the WLAN to the cellular network is performed based on the second predetermined threshold.

4. The method of claim 3, wherein the first measurement data and the second measurement data comprises data for one of a same parameter or a different parameter.

5. The method of claim 3, further comprising:
   prior to the iRAT handover, transmitting the multimedia data stream to the further UE over both the WLAN connection and the cellular network connection.

6. The method of claim 1, wherein transmitting the RTCP packets for the further UE over the cellular network via the currently camped base station is stopped.

7. An integrated circuit, comprising:
circuitry configured to establish a multimedia data stream with a user equipment (UE);
circuitry configured to identify a predetermined condition, wherein the predetermined condition indicates a decrease in quality of the multimedia data stream at the UE, and includes identifying a first measurement data that satisfies a first predetermined threshold;
circuitry configured to implement a mechanism based on the predetermined condition:
transmits the multimedia data stream as a real-time transport protocol (RTP) to the further UE via a wireless connection based on the first measurement data;
transmits a real-time transport control protocol (RTCP) packet to further UE over a cellular network connection via a currently camped base station, wherein the transmission of the RTCP packet enables the multimedia data stream to continue over the cellular network connection and identifies second measurement data satisfies a second predetermined threshold, wherein an inter-radio access technology (iRAT) handover from the WLAN to the cellular network is performed based on the second predetermined threshold; and
identify that the first predetermined threshold is no longer satisfied for a time window and the (iRAT) handover has not occurred, wherein the mechanism controls the decrease in quality of the multimedia data stream at the further UE.

8. The integrated circuit of claim 7, wherein the multimedia data stream is established via a wireless local area network (WLAN) connection, wherein the circuitry configured to identify the predetermined condition relates to the inter-radio access technology (iRAT) handover.

9. The integrated circuit of claim 7, further comprising the circuitry configured stop the transmission the RTCP packets for the further UE over the cellular network via the currently camped base station.

10. The integrated circuit of claim 7, wherein the circuitry configured to implement the mechanism based on the predetermined condition:
identifies second measurement data satisfies a second predetermined threshold, wherein the iRAT handover from the WLAN to the cellular network is performed based on the second predetermined threshold.

11. The integrated circuit of claim 10, wherein the first measurement data and the second measurement data comprises data for one of a same parameter or a different parameter.

12. The integrated circuit of claim 10, further comprising:
circuitry configured to, prior to the iRAT handover, transmit the multimedia data stream to the further UE over both the WLAN connection and the cellular network connection.

13. A user equipment (UE), comprising:
a transceiver configured to connect to one or more wireless networks; and
a processor communicatively coupled to the transceiver and configured to perform operations comprising:
establishing a multimedia data stream with a further UE;
identifying a predetermined condition, wherein the predetermined condition indicates a decrease in quality of the multimedia data stream at the further UE, the predetermined condition including identifying a first measurement data that satisfies a first predetermined threshold;
implementing a mechanism based on the predetermined condition comprising:
transmitting the multimedia data stream as a real-time transport protocol (RTP) to the further UE via the wireless network connection based on the first measurement data;
transmitting a real-time transport control protocol (RTCP) packet to the further UE over a cellular network connection via a currently camped base station based on the first measurement data, wherein the transmission of the RTCP packet enables the multimedia data stream to continue over the cellular network connection; and
identifying that the first predetermined threshold is no longer satisfied for a time window and an inter-radio access technology (iRAT) handover has not occurred, wherein the mechanism controls the decrease in quality of the multimedia data stream at the further UE.

14. The UE of claim 13, wherein the wireless network connection is a wireless local area network (WLAN) connection and the predetermined condition relates to the inter-radio access technology (iRAT) handover.

15. The UE of claim 13, wherein the mechanism comprises:
identifying second measurement data satisfies a second predetermined threshold, wherein the iRAT handover from the WLAN to the cellular network is performed based on the second predetermined threshold.

16. The UE of claim 15, wherein the first measurement data and the second measurement data comprises data for one of a same parameter or a different parameter.

17. The UE of claim 15, further comprising:
prior to the iRAT handover, transmitting the multimedia data stream to the further UE over both the WLAN connection and the cellular network connection.

18. The UE of claim 13, wherein transmitting the RTCP packets for the further UE over the cellular network via the currently camped base station is stopped.

* * * * *